(12) United States Patent
Bouchard

(10) Patent No.: US 6,401,831 B2
(45) Date of Patent: Jun. 11, 2002

(54) TINE STRUCTURE FOR BARE ROOT TREE AND STUMP EXTRACTING TOOL

(76) Inventor: John M. Bouchard, P.O. Box 315, Davenport, WA (US) 99122

( * ) Notice: Subject to any disclaimer, the term of this patent is extended or adjusted under 35 U.S.C. 154(b) by 0 days.

(21) Appl. No.: 09/819,164

(22) Filed: Mar. 27, 2001

Related U.S. Application Data

(63) Continuation-in-part of application No. 09/200,556, filed on Nov. 27, 1998, now Pat. No. 6,206,104.

(51) Int. Cl.⁷ .............................................. A01D 31/00
(52) U.S. Cl. ........................... 171/46; 171/45; 111/101; 37/302
(58) Field of Search .................... 37/301, 302, 303, 37/405, 410, 903, 403; 171/45, 46, 53, 63, 105, 106, 107; 414/716, 722, 723, 724, 725, 726; 111/100, 101

(56) References Cited

U.S. PATENT DOCUMENTS

| | | | |
|---|---|---|---|
| 2,303,415 A | * 12/1942 | Williams | 37/301 |
| 2,791,340 A | 5/1957 | Haines et al. | 114/140 |
| 3,103,076 A | 9/1963 | Schultz | 37/2 |
| 4,120,405 A | 10/1978 | Jones et al. | 214/1 HH |
| 4,356,644 A | * 11/1982 | Harkness | 172/448 |
| 4,641,439 A | * 2/1987 | Shirek | 172/274 |
| 4,676,013 A | 6/1987 | Endo | 37/2 R |
| 5,079,864 A | * 1/1992 | Roy | 37/302 |
| 5,111,599 A | 5/1992 | DeSlavo et al. | 37/2 R |
| 5,333,693 A | 8/1994 | Severeid | 171/82 |
| 5,476,356 A | 12/1995 | Weiss | 414/704 |
| 5,479,731 A | * 1/1996 | Widegren | 172/438 |
| 5,664,348 A | * 9/1997 | Omann | 171/132 |
| 5,950,549 A | 9/1999 | Stoner | 111/101 |
| 6,092,606 A | * 7/2000 | Basler | 171/63 |
| 6,146,081 A | * 11/2000 | Anderson | 37/405 |
| 6,267,547 B1 | * 7/2001 | Lund | 294/68.1 |

* cited by examiner

Primary Examiner—Robert E. Pezzuto
Assistant Examiner—Nathan Mammen
(74) Attorney, Agent, or Firm—Keith S. Bergman

(57) ABSTRACT

A tool, for mounting on a powering vehicle for transport, vertical motion and pivotal motion about a horizontal axis, provides a frame having connecting structure to interconnect with the powering vehicle. The frame carries extracting structure having plural laterally spaced extracting tines extending forwardly from the lower frame portion. At least one extracting tine has at least one depending vertical fin to increase tine strength and direct tine motion in a horizontal plane upon insertion through the earth; at least one extracting tine has at least one laterally extending horizontal fin to increase tine strength and direct tine motion in a vertical plane upon insertion through the earth; and at least one extracting tine has at least one soil retaining plate to aid support of material thereabove. The fins and plates tend to separate earth above and below the course of their insertion.

8 Claims, 3 Drawing Sheets

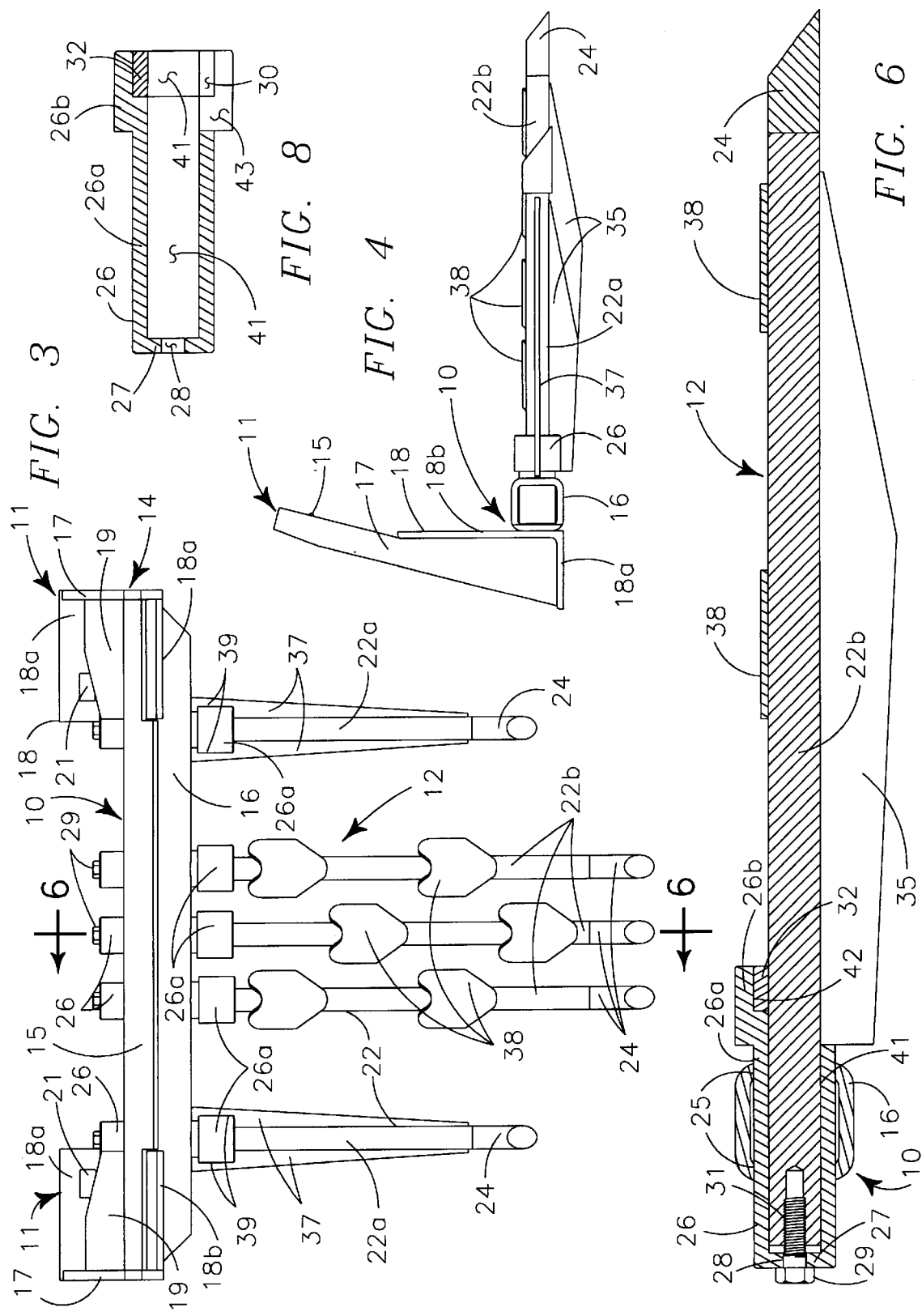

TINE STRUCTURE FOR BARE ROOT TREE AND STUMP EXTRACTING TOOL

RELATED APPLICATIONS

This is a continuation in part of an application Ser. No. 09\200,556 filed Nov. 27, 1998 and now U.S. Pat. No. 6,206,104.

BACKGROUND OF INVENTION

1. Field of Invention

This invention relates generally to a tool for removing arborescent material from the earth and more particularly to a removable tine structure for the tool that provides support for the removed root and earth structure and partial severance of that structure from earth structure below the tine structure during removal.

2. Background and Description of Prior Art

As the extraction of larger nursery stock has developed and progressed, especially from manual to mechanical methods, two different processes for extraction and preservation of the viability of the stock from the time of extraction to reestablishment in the earth have developed, the first being the "balled root" process and second being the "bare root" process.

The bare root mechanical extraction process is the older probably because of its similarity to previously existing manual extraction methods, but the most recent mechanical process to establish economic viability in the modern nursery industry, and that still most commonly used, is the balled root process. In the balled root mechanical extraction process, the ball of roots and associated earth material in proximity to the trunk or stem of a plant is preserved and the peripheral root system outside that area is removed by the extraction process or thereafter. The remaining root and earth ball then generally is encased either in some type of a wrapping, such as burlap or degradable cellulosic material established thereabout and maintained by tying or other fastening, or by placement in configurationally sustaining containers such as open top cans or pots. This method of extracting, transporting and merchandising trees, shrubs and other larger plants normally removes substantial amounts of the peripheral and tap root systems of the plants and may cause disruption of the overall biological systems of removed plants with resultant shock-type reactions that may be sufficient to kill the plants over a period of time, if not immediately, or to substantially lessen their viability.

In the bare root mechanical extraction process the soil about the roots of a tree, shrub or plant is loosened and thereafter the root structure is lifted from the earth to maintain a greater proportion of the peripheral root structure, and tap root if present, outside the central ball that would be preserved in the balled root extraction process. Bare root extraction generally tends to be less damaging to the biological system of the extracted plant because of its less destructive nature and, with proper maintenance of environmental conditions from the time of extraction to reestablishment of the extracted plant in the earth, the system tends to provide higher survival rates for nursery stock and generally makes transportation and storage of the extracted material easier and more simple. Though bare root type extraction, especially of larger nursery stock, has increased in the recent past, it probably is not and has not been so extensively used as balled root extraction largely because of the difficulties involved in the bare root extraction process and the lack of specific mechanical apparatus to efficiently and effectively accomplish it.

Traditional digging tools of mechanical earth moving equipment such as buckets, shovels and the like are not particularly effective in plant extraction as these tools tend to shear the earth where they enter it and this action also tends to shear or otherwise damage root structure in the path of the digging device to damage or destroy substantial amounts of that root structure in and outwardly of the digging area.

Attempts have been made to accomplish bare root extraction by pulling the roots of larger plants from the earth by use of machines such as shovels or cranes. A flexible tension element is fastened about the plant trunk or stem above the earth sustaining it and extracting by pulling the tension element and interconnected plant upwardly. This process has not proven particularly effective because, at the time of pulling, the peripheral root structure commonly is widespread, relatively delicate and substantially embedded in the surrounding earth. By reason of the comparatively low tensile strength of the peripheral root systems of plants and the nature of their earth embedment, substantial portions of the peripheral roots are damaged or severed from a plant removed in this manor. Usually fewer roots remain after pulling type extraction than would remain were the plant extracted by traditional balled root extraction methods.

The extraction tool that is the subject of the parent patent (U.S. Pat. No. 6,206,104, hereafter '104) provides a device particularly adapted for traditional bare root extraction of arboreous and other plant material. The instant invention provides a modified tine structure for the tool disclosed in the parent patent that just as simply and effectively provides for modified bare root extraction of arboreous or other plant material which maintains in place a substantial portion of earth imbedded about the plant root structure above the extractor tines. The instant invention retains the plural removable and interchangeable extracting tines of the parent tool with one or more vertically oriented fins depending from one or more of the extracting tines, while adding to one or more extracting tines, one or more horizontal fins, one or more somewhat horizontally orientated soil retaining plates, or combinations thereof. The horizontal fins and soil retaining plates are spaced relative to each other in a supportive areal array provides greater total horizontal surface area than do the tines of the parent extractor. Because of the greater total horizontal surface area of the extracting structure the earth above the structure is better separated from the earth therebelow during the extraction process and the material above the structure is better supported. This action tends to better preserve the extracted root and earth material above the extractor structure in its original state.

The forward facing edges of the horizontal fins and soil retaining plates slope laterally outward in a rearward direction to tend to move plant roots laterally along and away from the fin and plate edges as they move through the earth to lessen or prevent severance of and damage to contacted roots. The soil retaining plates also preferably have their laterally extending sides angulated downwardly in a vertical plane to further aid in moving contacted roots along the plate edges to further prevent root damage or severance.

The addition of horizontal fins tends to somewhat increase the vertical cross-sectional area of the extracting structure and this increases the force necessary to insert the extracting structure through the earth. The amount of required insertion force may be somewhat lessened by sharpening the forward earth contacting edges of the fins and plates. To accommodate the greater stresses and strains placed upon the instant extracting tool, the structure interconnecting the tool tines with the supporting tine beam has been modified to provide greater strength while yet maintaining the simple and easy releaseable interconnection of the tines with the tine beam.

The operation of the instant tool is substantially the same as the operation of the bare root extraction tool set forth in the parent patent '104 which is therefore made a part of this application by reference as if set forth herein. The only difference in operation of the instant tool from that of its parent is that when the instant extracting structure is inserted through and under root structure, the horizontal fins and soil retaining plates will tend to separate the earth thereabove from the earth therebelow. If that earth contains roots, the plates and fins will tend to move those roots that they contacted outwardly along the contracting edges and out of the course of penetration of the plates and fins to lessen severance of the roots and damage to them. By reason of this action the tap root structure, if present, and the finer root structure will remain intact to substantially the same extent as if the fins and plates were not present. The soil above the fins and plates will be largely undisturbed and remain about the upper root structure of the plant. This process results in an extracted plant having substantially the root structure of bare root extraction, but yet with attached soil about the upper root structure substantially the same as in balled root extraction. This type of extraction is what is referred to as "modified bare root extraction" herein.

The instant tine structure also serves a secondary function of better supporting plants or other extracted material for transport by reason of its greater total horizontal area.

The instant tool uses substantially the same supporting frame structure as that of the parent extractor tool and by reason of this provides the same economic viability of allowing operation by systems of existing earth moving vehicles having three point, four point or connecting plate type tool connectors. The parent extracting tool has found particular use with smaller vehicles of either the wheeled or track supported skidsteer type, such as the Bobcat® manufactured by Bobcat Company, 250 East Beaton Drive, West Fargo, N. Dak., and is readily attachable to the connecting plates of this type of vehicle.

The horizontal fins and soil retaining plates of the instant tool make it somewhat more effectively functional than the parent tool, as the instant tool provides substantially the same vertical fins with the addition of horizontal fins which tend to provide an additional stabilizing function in a vertical plane similar to that which the vertical fins provide in a horizontal plane. The instant extractor tends to stabilize tines in three dimensional space whereas the parent device tends to stabilize fins only in a somewhat horizontal two dimensional plane.

The instant tool further provides modified bare root extraction which provides a new and different product than either traditional bare root or balled root extraction, but yet one that may be easily modified into either traditional product. The earth about the upper root structure of the extracted plant may be readily removed to provide a bare root extracted product. The root structure extending beyond the earth about the upper portion of the roots may be selectively trimmed to provide a balled root type of extracted product.

The instant tool also provides substantially the same multi-functional use as the parent tool. It may be used in the horticultural industry for removing plants and stumps, for general land clearing, for removing various other material from the earth and for transporting materials generally. These multi-purpose functions tend to make the tool more economically viable, especially in small business operations.

My invention lies not in any one of these functions individually, but rather in the synergistic combination of all of its structures which necessarily gives rise to the functions flowing therefrom.

SUMMARY OF INVENTION

The modified bare root plant extractor provides a peripherally defined frame having structure for mounting on the tool connecting plate of an earth moving vehicle for transport and adjustable vertical and tilting motion. The frame provides an elongate laterally extending lower horizontal tine beam releaseably carrying a plurality of laterally spaced extracting tines extending forwardly from individual releaseable mounting structures. One or more of the extracting tines carry one or more vertically depending fins to provide strength and direct tine motion in a horizontal plane upon passage through the earth; one or more extracting tines carry one or more horizontal fins to direct tine motion in a vertical plane upon passage through the earth and provide support for earth and root material thereabove. One or more extracting tines carry one or more soil retaining plates to support earth and plant material thereabove.

In providing such a device it is

A principal object to create a tool for use on lifting and tilting connector structure of existing powering vehicles, such as tractors, backhoes and excavators, for modified bare root extraction of trees, plants and other material from the earth in which they are resident.

A further object is to provide such a tool that has a plurality of elongate, laterally spaced extraction tines that are inserted into the earth beneath an object to be removed and pivoted upwardly to loosen the object from the earth therebeneath for subsequent vertical lifting from the earth.

A further object is to provide such a tool that has extracting tines of substantial length and small cross-sectional area that carry one or more depending vertical fins to provide additional strength and guide tine motion during passage through the earth to aid in maintaining the relaxed array of the tines in a horizontal plane during their motion in the earth.

A further object is to provide such a tool wherein one or more Of the extracting tines carry one or more laterally extending horizontal fins to guide tine motion in a vertical plane during passage through the earth to aid in maintaining the relaxed array of the extracting rods during earth insertion, to aid in defining a separation plane between earth above and below the tine structure and to provide a larger horizontal surface area for support of extracted or transported materials.

A further object is to provide such a tool wherein one or more of the extracting tines carry one or more soil retaining plates to better support material thereabove and aid in separating earth above the plates from earth therebelow.

A further object is to provide such extracting tines that are releaseably interconnected to a supporting tine beam by collar structures providing simple and easy fastening and release of the tines while yet maintaining substantial rigidity and strength of the connection.

A still further object is to provide such a tool that when removing arboraceous or other plant material tends to preserve root structure in the course of tine insertion by moving roots laterally away from horizontal fins and soil retaining plates while leaving substantial amounts of soil surrounding the root structure above the tine insertion course for modified bare root type extraction.

A still further object is to provide such a tool that has multiple uses for extracting and moving materials to increase its economic viability.

A still further object is to provide such a tool that is of new and novel design, of rugged and durable nature, of simple and economic manufacture and one otherwise well suited to the uses and purposes for which it is intended.

Other and further objects of my invention will appear from the following specification and accompanying drawings which form a part hereof. In carrying out the objects of the invention however, it is to be understood that its essential features are susceptible of change in design and structural arrangement with only one preferred and practical embodiment of the best known mode being illustrated in the accompanying drawings and specified as is required.

BRIEF DESCRIPTION OF DRAWINGS

In the accompanying drawings which form a part hereof and wherein like numbers of reference refer to similar parts throughout:

FIG. 3 is an orthographic top view of the tool of FIG. 1.

FIG. 4 is an orthographic right side view of the tool of FIG. 1.

FIG. 6 is a somewhat enlarged medial vertical cross-sectional view through one of the tines of the tool of FIG. 3, taken on the line 6—6 thereon in the direction indicated by the arrows.

FIG. 8 is a medial vertically cross-sectional view of the tine connector of FIG. 6 to show its internal structure more completely.

DESCRIPTION OF PREFERRED EMBODIMENT

Figure 1:
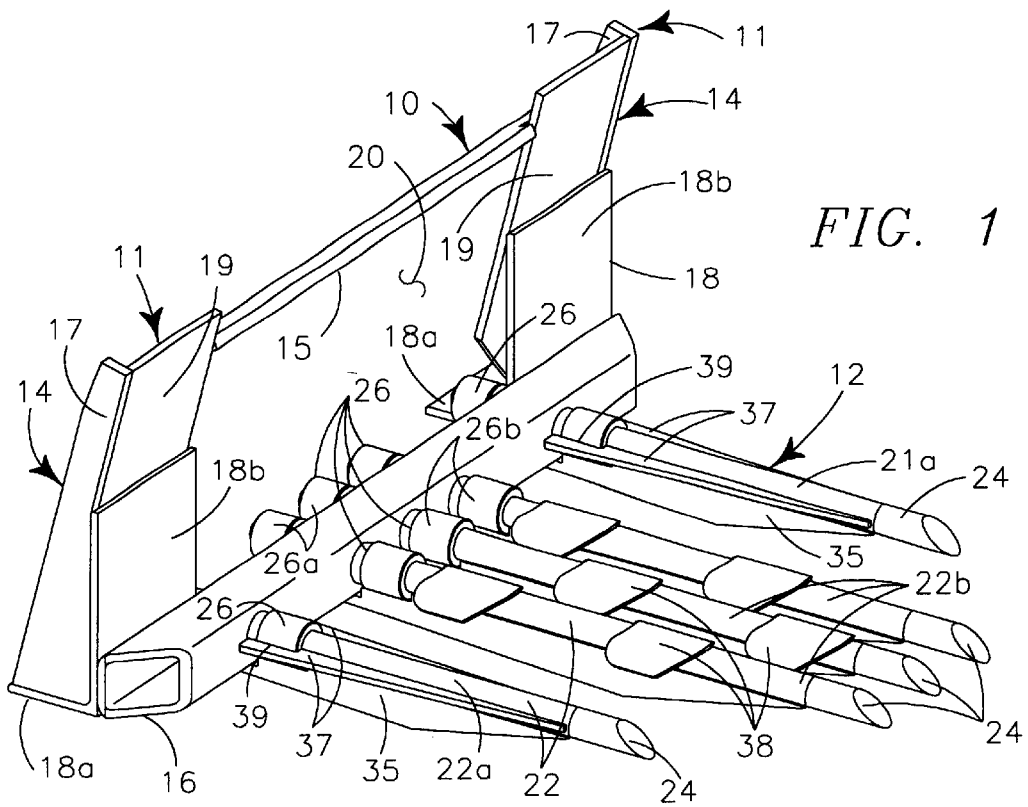
FIG. 1 is a rearward looking isometric view of the extracting tool taken from a forward aspect to show various of its parts, their configurations and relationship.
Figure 2:
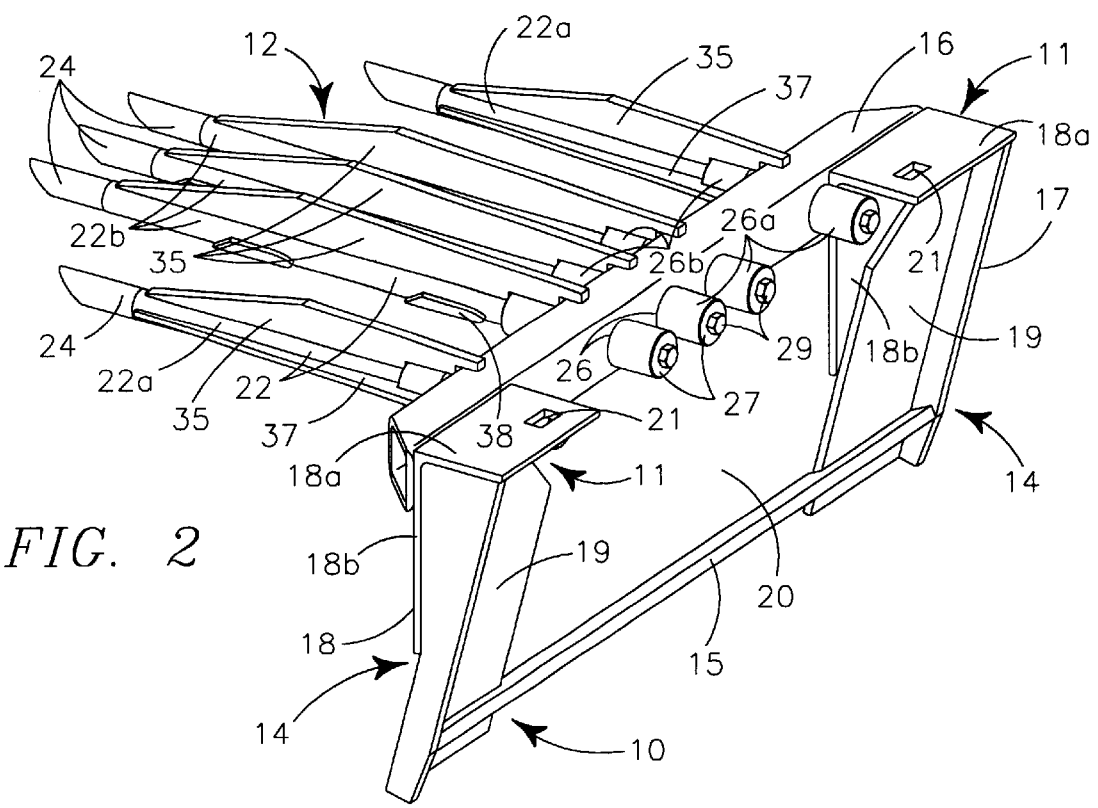
FIG. 2 is an isometric upside down view of the tool of FIG. 1 looking forwardly from a rearward aspect to better show the bottom structure of the tool.
Figure 5:
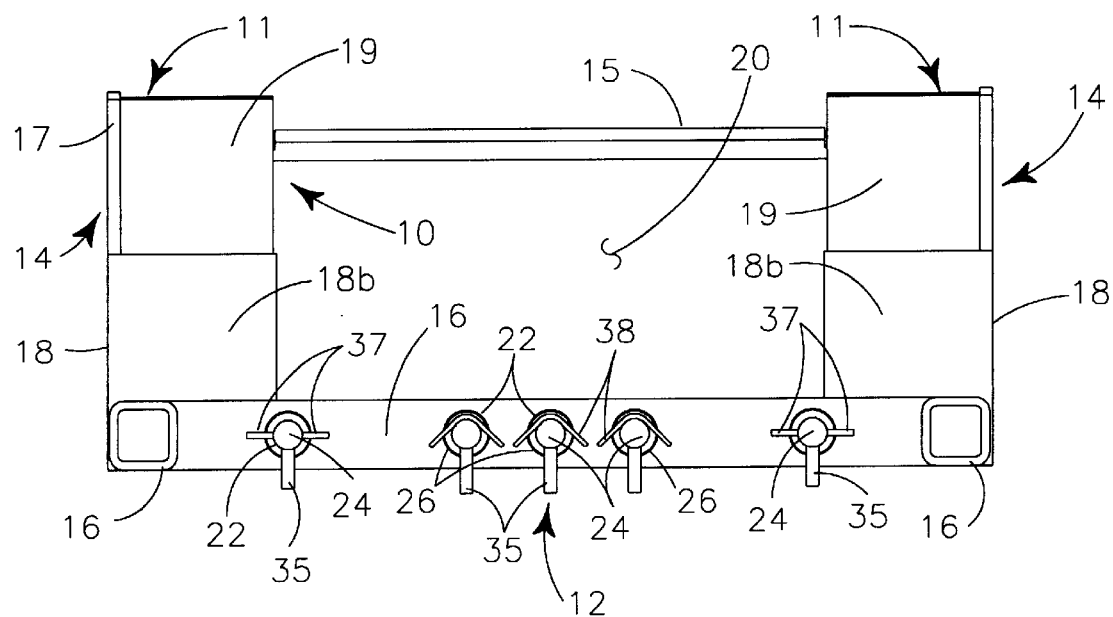
FIG. 5 is an orthographic front view of the tool of FIG. 1.

Referring to FIGS. 1 and 2, it is seen that the tool generally provides frame 10 carrying connection structure 11, for interconnection with the tool connection plate of powering vehicle 13, and extracting structure 12 extending forwardly from the frame.

Frame 10 provides similar sides 14 interconnected in their upper portions by upper horizontal beam 15 and in their lowermost portions by lower tine beam 16. Both upper horizontal beam 15 and lower tine beam 16 are box-type beams with the tine beam having a larger cross-sectional size to provide appropriate strength and rigidity and a configuration adaptable to allow interconnection of tines therein. The sides 14 are mirror images of each other, each formed by vertical planar side plate 17 structurally carried by L-shaped angled bottom element 18 having lowermost bottom plate 18a and upstanding fastening arm 18b configured to structurally interconnect with the lower forward facing edge of the adjacent side 17. The fastening arm 18b has a vertical extension terminating spacedly below the uppermost extension of the side 17. Reinforcement plate 19 extends downwardly in a somewhat angulated orientation from the upper edge of side plate 17 with its lateral edge in immediate adjacency to the inwardly facing surface of the side plate, its forward surface in immediate adjacency with the rearward upper edge of fastening arm 18b of the angled bottom element 18 and its lower edge in immediate adjacency with the upper surface of bottom plate 18a of the angled bottom element so that all of the elements 17, 18 and 19 may be structurally joined at their adjacent portions to form the three dimensional side structure 14 illustrated, which provides necessary strength and rigidity for the frame when formed from sheet steel elements.

Upper horizontal beam 15 extends laterally between the proximal inner surfaces of opposed sides 17 and in immediate adjacency with the rearward surfaces of reinforcement plates 19 to which it is structurally joined. Tine beam 16 extends between the distal lateral edges of fastening arms 18b of the opposed angled bottom elements 18 and in adjacency with the forward surfaces of the fastening arms 18b where it is structurally joined. Preferably all of these frame elements are formed of steel and structural joinder of the elements is accomplished by welding for appropriate rigidity, strength and simplicity of manufacture.

Figure 7:
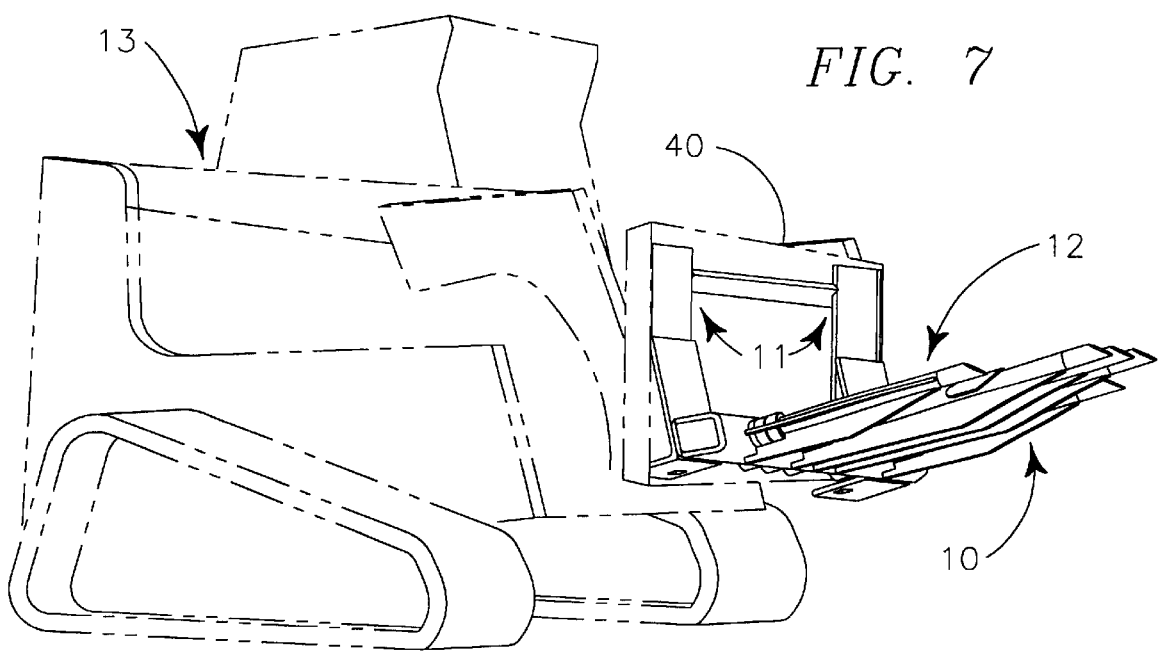
FIG. 7 is a rearward looking isometric view of the tool of FIG. 1 mounted on a skidsteer type vehicle shown generically in phantom outline.

The dimensions and configuration of frame 10 are such as to allow the frame to interfit with connecting structures of existing powering vehicles. The particular frame configuration illustrated is adapted for use with a skidsteer type tool connecting structure which, as seen in FIG. 7, provides mounting plate 40 supported on spaced lifting arms with a tilting arm communicating medially therebetween. The mounting plate generally fits in the rearwardly opening space 20 defined horizontally between the proximal surfaces of sides 14 and vertically between the upper surface of bottom plates 18a and upper horizontal beam 15. The frame elements define such orifices 21 for interconnecting structures or fasteners as may be necessary to interconnect the tool with the tool mounting plate of the particular powering vehicle that is to carry it. The tool also may provide other mounting structure (not shown) to allow direct mounting on opposed lifting arms and one or more tilting arms of ordinary three point or four point hitches in the same fashion disclosed for the parent tool and such other mounting of the instant tool on a carrying vehicle is within the ambit and scope of my invention.

Extracting structure 12 provides a plurality of elongate spacedly arrayed extracting tines 22, in the instance illustrated formed of circularly cylindrical rods carrying solid wedge shaped teeth 24 in their forward outer end portions to aid insertion of the tines into the earth. The teeth are formed separately from the tines to allow use of harder more durable material for the teeth and are connected to associated tine by welding. The tines may be formed of tubular material (not shown) rather than solid material and such tubular material is within the ambit and scope of my invention. The circularly cylindrical shape of the tines is not a necessary configuration and other cross-sectional shapes are within the ambit and scope of my invention. The tines 22 illustrated extend substantially perpendicularly from the frame 10, but this angular relationship is not essential and the included angle between the frame legs 14 and tines 22 may generally vary from about 70 to 140 degrees depending on the particular connector structure on which the tool is to be mounted.

Each tine 22 is interconnected with tine beam 16 of frame 10 as seen in detail in FIG. 6. Elongately paired sets of holes 25 are defined in the forward and rearward sides of tine beam 16 for each tine 22 that the beam is to carry. Each paired set of tine beam holes 25 carries a tine connector 26, having diametrically smaller rearward cylindrical portion 26a to fit within the tine holes 25 where it is structurally carried to extend spacedly from both sides of tine beam 16. The forward portion of the tine connector defines axially aligned larger cylindrical portion 26b. Axially aligned cylindrical tine channel 41 is defined in rearward cylindrical portion 26a to receive a tine 22 in a slidable fit and communicates with diametrically larger axially aligned cylindrical fastening ring channel 42 defined in larger cylindrical portion 26b. Radially extending fin slot 43 is defined in the lowermost portion of the enlarged cylindrical portion 26b to extend radially inwardly to communicate with fastening ring channel 42 to receive the rearward portion of a vertical fin in a supportative fit.

The inner or rearward end portion of the tine connector 26 provides structurally interconnected disk-like rear cover 27 defining medial tine fastener hole 28 to receive tine fastening bolt 29 extending therethrough. The rearward end portion of each extracting tine 22 defines inwardly extending threaded hole 31 to receive fastening bolt 29 in threaded engagement. Each tine structurally carries fastening ring 32 about its external surface spacedly forwardly of its rearward end portion. The fastening ring 32 is a circularly cylindrical annulus having an external diameter to slidably fit within fastening ring channel 42 and is so positioned axially on the extracting tine 22 carrying it that when the fastening ring abuts on the rearward shoulder of the fastening ring channel 42, the rearward end portion of the extracting tine 22 is spaced forwardly of the forward facing surface of rear cover 27. The fastening ring 32 defines radially extending vertical fin slot 30 in its lowermost surface to communicate radially through the ring to receive a vertical fin carried in slot 43 defined in the tine connector 26. With this structure fastening bolt 29 may be tightened in rear cover hole 31 to releaseably fasten the extracting tine in a strong, rigid and durable interconnection in tine connector 26.

At least one and preferably all of extracting tines 22 carry structurally interconnected rudder-like vertical fins 35 depending from the lower surface of the tine. The vertical fins 35 extend rearwardly through fin slot 30 defined in fastening ring 32 and fin slot 43 defined in cylindrical tine connector portion 26b to the rearward surface of the cylindrical portion 26b to strengthen the interconnection of the extracting tines 22 in the tine connector 26. The vertical fins 35 not only provide guidance for the extracting tines 22 as they are moved through the earth, but also serve as a beam to provide additional strength and rigidity for the tines and therefore preferably extend over substantially the full length of the extracting tines.

At least one extracting tine and preferably both laterally outer extracting tines 22a carry at least one laterally extending horizontal fin 37. These horizontal fins are relatively thin sheet-like structures and are formed with triangular peripheral configurations, as seen especially in FIG. 3. The two similar lateral tines 22a each carry similar opposed triangularly shaped horizontal fins 37 that are co-planar with the axis of the tine and extend rearwardly to define notches 39 to fit over tine connector 26 and to the forward surface of tine beam 16. This type of horizontal tine not only provides guidance for the tine in a vertical plane, but also provides additional strength and rigidity for both the tine and its connecting structure as well as increasing the total horizontal area of the extracting structure to better support material resting thereon.

The three medial tines 22b each carry on their upper surfaces relatively thin laterally extending soil retaining plates 38 having somewhat of an arrowhead shape with both sides angled downwardly about an elongate medial line. The soil retaining plates 38 preferably are axially spaced along each tine carrying them with the plates on a first tine being axially spaced so the plates on an adjacent second tine are positioned at the space between fins on the first tine to provide an array of fins that minimizes larger spaces between the plates and the extracting tines to create a better and somewhat more uniform horizontal supportative surface for the extracting structure. The horizontal soil retaining plates 38 are positioned on the upper surface of the tines carrying them to provide a better and somewhat more distinctly defined horizontal supporting surface for the extracting structure.

The configuration of the soil retaining plates illustrated is not essential to their operability and various other configurations of these plates than the one illustrated are operative and may be effective in particular situations. One essential configurational feature of all fins and earth supporting plates, however, is the rearward and outward angulation of forward earth contacting edges of the fins or plates to lessen or avoid root severance or damage by tending to move roots contacted by the fin outwardly away from the fin. The spacial orientation of triangular horizontal fins 37 need not be coplanar in a horizontal plane as illustrated, but rather the fins may be angled relative to each other but preferably in a fashion that does not create unbalanced forces on the extracting structure when it is moved through the earth. When the horizontal fins or soil retaining plates are angulated from a horizontal plane, their effect in maintaining directional stability in a vertical plane of the extracting tines carrying them may be somewhat lessened in proportions to the amount of their angulation from a horizontal plane, but at the same time the angulated fins have an increased effect of maintaining stability of a carrying tine in a horizontal plane. Angulated horizontal fins and soil retaining plates tend to better move contacted root structure outwardly away from the fin or plate contacting it without damage than do coplanar horizontally orientated fins and plates.

The particular individual configuration and communal array of tines 22 that is illustrated is not essential to the operation of my tool and both the configuration and array may be varied for particular purposes, particularly as to the length of tines and as to their lateral positioning. Similarly the positioning of both vertical and horizontal fins is not essential to the operation of my tool and variations of such positioning from that illustrated are within the ambit and scope of my invention.

Having thusly described my tool its operation may be understood. Though the operation is substantially similar to that of the parent tool described in the '104 patent, the results of the operation are somewhat different.

For use an extracting tool formed according to the foregoing specification is attached to the tool mounting plate 40 of powering vehicle 13, which in the instance illustrated in FIG. 7 is a track supported skidsteer type tractor. This skidsteer provides a traditional forwardly positioned tool mounting plate 40 for adjustable vertical and tilting motion. The extracting tool is appropriately positioned on the skidsteer tool plate and interconnected with the connecting structure of that plate, with the extracting tines of the tool extending in a forward direction.

After tool mounting the skidsteer is moved into adjacency with a tree or other object to be extracted and the tool is tilted by operation of the tractor's tilt arm to pivot the extracting tines 22 downwardly until the tines are adjacent to or touch the earth spacedly distant from the stock of a plant, trunk of a tree or other material to be extracted. This spaced distance for plants of normal nursery size and extraction tines of approximately 36 to 42 inch length is approximately 24 to 36 inches. The tool is then further tilted if necessary so that the included angle between the tines and a horizontal plane tangent to the earth's surface at the place of tine contact is approximately 30 to 45 degrees. The skidsteer then is moved forwardly toward the material to be extracted so that the extracting tines move into the earth and at least partially under or within the root structure of the plant. This motion is continued normally until lower tine beam 16 is immediately upwardly adjacent the earth's surface and the tines are fully inserted in the earth. At this point, the earth and any plant root structure will tend to be somewhat loosened and the earth above the tines somewhat severed from the earth below the tines along the course of travel of the extracting structure. If necessary for proper extraction this loosening process may be repeated once or more from different positions about the plant or other material to be extracted.

To remove the plant from the earth wherein it resides when the extracting tines are positioned beneath it, the tilting arm of the skidsteer is operated to pivot the forward end portions of the extracting tines 22 upwardly to further loosen root structure and segregate earth above the extracting tines from earth therebelow. The pivotal motion is continued and simultaneously the lift arms of the skidsteer are operated to raised the extracting tines upwardly. This compound tool motion is continued until the extracting tines are at least horizontal, the extracting object has been extracted from the earth and connection of the extracted material with the earth is disestablished. The pivotal motion of the tool may be continued until the stock of a plant or other extracted material tips toward skidsteer vehicle 13 when the material may be supported by or fastened to the frame 10 for more stability during any subsequent transport. In this condition, with or without additional support or fastening, the extracted material resting on the extracting tines may be moved by the skidsteer to a position for disposition. The loading process described is reversed to unload the extracted material.

A tree or larger plant extracted by the forgoing process will have substantially the same remaining root structure as if it were extracted by traditional bare root methods or by the tool of my parent '104 patent, but yet retains a clump of earth and roots immediately below the juncture of the roots and stem or trunk that is similar to the ball remaining after traditional balled root extraction.

It is to be noted from the foregoing description that the instant tool may be used for the removal of stumps, rocks or other objects supported on or imbedded in the earth, aside from viable nursery stock, to make the tool useful for land clearing functions in general and removal of larger material from the upper portion of the earth surface.

It is also to be noted that the size and strength of the tool are not limited by its function or use and both parameters may be increased as required to extract large trees, shrubs and other material from the earth.

It is further to be noted that the particular connecting structure illustrated is not essentially limited to that illustrated and described. The tool may be used with common three and four point hitches of present day earth moving machine with appropriate modification of the tool fastening structure to accept the fastening structure of a particular hitch. This adaption is well within the skill of an ordinary mechanic familiar with the earth moving machine art, disclosed in the parent '104 patent and therefore is within the ambit and scope of the instant invention.

The foregoing description of my tool is necessarily of a detailed nature so that a specific embodiment of it might be set forth as required, but it is to be understood that various modifications of detail, rearrangement and multiplication of parts might be resorted to without departing from it spirit, essence or scope.

Having described my invention, what I desire to protect by Letters Patent and

What I claim is:

1. A tool, for use on a powering vehicle having tool mounting structure and at least one lifting arm and at least one tilting arm to move the tool mounting structure vertically and pivotally about a horizontal laterally extending axis, to extract material from the earth, comprising in combination:

a frame having laterally spaced upstanding sides interconnected in their lower portions by a tine beam and in their upper portions by an upper horizontal beam, said frame having means for releaseable interconnection with the tool mounting structure of the powering vehicle; and extracting structure having a plurality of elongate extracting tines releaseably carried in laterally spaced array by the tine beam to extend forwardly therefrom in a direction distal from the powering vehicle, at least one of said extracting tines having at least one vertical fin depending from the at least one extracting tine, at least one of said extracting tines having at least one horizontal fin extending laterally from the at least one extracting tine, and at least one of said extracting tines having at least one soil retaining plate extending laterally from the at least one extracting tine.

2. The tool of claim 1 wherein at least one extracting tine comprises an elongate rod having a forward end portion and a wedge shaped tooth carried by the forward end portion to aid motion of the extracting tine through the earth.

3. The tool of claim 1 wherein at least one extracting tine has a forward end and a rearward end and is releaseably carried in a tine connecter having forward and rearward portions and extending through and beyond paired cooperating holes defined in forward and rearward surfaces of the tine beam:

said tine connector defining a medial tine channel in the rearward portion to receive the at least one extracting tine, having a rear cover defining a fastening hole communicating with the medial channel to receive a tine fastening bolt therethrough, and defining a fastening ring channel, radially larger than the medial channel and axially aligned therewith, in the forward portion of the tine connector; and said at least one extracting tine defining a threaded hole in its rearward end to receive a fastening bolt carried in the fastening hole defined in the rear cover, carrying a fastening ring extending radially outwardly from the at least one extracting tine at an axial position such that when the fastening ring is carried in the fastening ring channel, the rearward end of the at least one extracting tine is within the medial tine channel and spacedly forward of the rear cover of the tine connector; and a fastening bolt extending through the fastening hole defined in the connector rear cover and into operative engagement in the threaded hole defined in the rearward end of the at least one extracting tine to fasten the at least one extracting tine in the tine connector.

4. The tool of claim 1 wherein horizontal fins extend laterally on both sides of the at least one extracting tine carrying them, soil retaining plates extend laterally of both sides of the at least one extracting tine carrying them and each laterally extending portion of the soil retaining plates is angulated to the other laterally extending portion at an included angle less than 180° and more than 45°.

5. A tool, for use on a powering vehicle having tool mounting structure that is adjustably movable vertically and pivotally about a horizontal axis, for modified bare root extraction of arboreal and plant material from the earth, comprising in combination:

a frame having paired opposed sides interconnected by an upper horizontal beam and a lower tine beam, said frame having rearward connection structure to releaseably interconnect with tool mounting structure of the powering vehicle;

extracting structure carried by the frame including plural elongate extracting tines having forward and rearward ends releaseably carried in laterally spaced array by the lower tine beam to extend forwardly from the tine beam, all said extracting tines having
mucronate teeth at the forward ends to said penetration of the extracting tines in the earth, and
connecting means for releaseable interconnection of the tine connectors carried by the lower tine beam, at least one extracting tine
carrying at least one structurally interconnected vertical fin extending parallel to the at least one extracting tine and depending therefrom to strengthen the tine and aid determination of the tine's course in a horizontal plane during insertion through the earth,
carrying at least one structurally interconnected horizontal fin extending in a lateral direction beyond the at least one tine to aid determination of the tine's course in a vertical plane during insertion in the earth, strengthen the tine and provide greater horizontal supportive surface for the extracting structure, and
carrying at least one soil retaining plate extending laterally beyond each tine side with the laterally extending portions of the at least one soil retaining plate angled relative to each other at an included angle of more than 45° and less than 180°.

6. The tool of claim 5 wherein forward earth contacting edges of the vertical fins, the horizontal fins and the soil retaining plates are angled in a rearwardly and outwardly extending configuration to aid passage through the earth and separation of earth above and below the fins and plates and prevent severance of and damage to contacted roots.

7. The tool of claim 5 wherein forward earth contacting edges of the vertical fins, the horizontal fins and the soil retaining plates are angled in a rearwardly and outwardly extending configuration and sharpened to aid passage through the earth and separation of the earth above the fins and plates from earth therebelow.

8. In a tool, for extraction of plant material from the earth, for use on a powering vehicle having tool mounting structure powered for vertical motion and pivotal motion about a horizontal axis, said tool having a frame with means for releaseable interconnection to the tool mounting structure of the powering vehicle and extracting structure having plural laterally spaced extracting tines extending forwardly from the frame, the improvement comprising:

at least one extracting tine carrying at least one structurally interconnected vertical fin extending parallel to the at least one tine and depending therefrom;

at least one extracting tine carrying at least one structurally interconnected horizontal fin extending laterally therefrom; and at least one extracting tine carrying at least one soil retaining plate having lateral portions extending laterally therefrom, said lateral portions angulated relative to each other at an included angle greater than 45° and less than 180°.

* * * * *